United States Patent
Kang et al.

(10) Patent No.: US 8,565,607 B2
(45) Date of Patent: Oct. 22, 2013

(54) VISIBLE LIGHT MULTIPLEX COMMUNICATION SYSTEM

(75) Inventors: Yanggi Kang, Suwon-si (KR); Jungsung Park, Hwasung-si (KR); Kwangjin Oh, Suwon-si (KR)

(73) Assignee: Idro Co., Ltd., Gyeonggi-do (KR)

( * ) Notice: Subject to any disclaimer, the term of this patent is extended or adjusted under 35 U.S.C. 154(b) by 264 days.

(21) Appl. No.: 13/112,057

(22) Filed: May 20, 2011

(65) Prior Publication Data

US 2011/0217044 A1  Sep. 8, 2011

Related U.S. Application Data

(63) Continuation of application No. PCT/KR2010/000451, filed on Jan. 25, 2010.

(30) Foreign Application Priority Data

Jan. 30, 2009  (KR) .......................... 10-2009-007478

(51) Int. Cl.
*H04B 10/00* (2013.01)
(52) U.S. Cl.
USPC .......................................... 398/128; 398/129
(58) Field of Classification Search
USPC ................................................ 398/118–131
See application file for complete search history.

(56) References Cited

U.S. PATENT DOCUMENTS 8,044,812 B2 * 10/2011 Harres .......................... 340/619
8,295,705 B2 * 10/2012 Kim et al. ..................... 398/103

FOREIGN PATENT DOCUMENTS

| JP | 2006-253934 A | 9/2006 |
| KR | 2005-0071617 A | 7/2005 |
| KR | 10-0594120 B1 | 6/2006 |
| KR | 2007-0105003 A | 10/2007 |
| KR | 2008-0100093 A | 11/2008 |

OTHER PUBLICATIONS

International Search Report: mailed Aug. 18, 2010; Appln: PCT/KR2010/000451.

* cited by examiner

*Primary Examiner* — Danny Leung
(74) *Attorney, Agent, or Firm* — Ladas & Parry LLP

(57) ABSTRACT

A visible light multiplex communication system is presented which includes identification (ID) information and data information which can be simultaneously transmitted and received to and from a server and a plurality of clients by using visible light. Visible light ID communication and visible light data communication do not interfere with each other in the same space during visible light communication. In addition, data can be efficiently transmitted and received to and from a plurality of ID clients using visible light. In addition, visible light ID communication and visible light data communication can be efficiently performed in a state where interference between clients using different protocols does not occur in the same place. Furthermore, a specific unit that is capable of efficiently transmitting and receiving data to and from a plurality of clients by using visible light can be provided.

8 Claims, 11 Drawing Sheets

VISIBLE LIGHT MULTIPLEX COMMUNICATION SYSTEM

CROSS-REFERENCE TO RELATED PATENT APPLICATION

This application claims the benefit of Korean Patent Application No. 10-2009-0007478, filed on Jan. 30, 2009, in the Korean Intellectual Property Office, the disclosure of which is incorporated herein in its entirety by reference.

BACKGROUND OF THE INVENTION

1. Field of the Invention

The present invention relates to a visible light multiplex communication system, and more particularly, to a visible light multiplex communication system in which identification (ID) information and data information can be simultaneously transmitted and received to and from a server and a plurality of clients by using visible light.

2. Description of the Related Art

A visible light communication system uses visible light having a wavelength of about 380 nm to 780 nm that can be seen by the naked eye. As light-emitting diodes (LEDs) have drawn attention as a next generation illumination that replaces a general fluorescent lamp or incandescent lamp, visible light communication using LEDs starts to be used. Examples of light-emitting bodies that can be used in visible light communication include laser diodes (LDs) and LEDs.

A type of optical communication that is similar to visible light communication is infrared ray communication using infrared rays. However, since infrared rays cannot be seen by the naked eye, it is difficult to easily recognize the location of a light source. Furthermore, an infrared ray infrastructure has not been constituted, and infrared rays may affect human eyes adversely.

In addition, in a radio frequency (RF) method that is widely used as a wireless communication method, data can be easily transmitted from a device through an obstacle over a long distance. However, it is not easy to use the RF method only in a restricted space, and there is a large probability that interference occurs in aircrafts, medical devices, and the like and a device may malfunction.

Visible light communication may include visible light identification (ID) communication and visible light data communication according to the purpose of use.

The difference between visible light ID communication and visible light data communication is the purpose of use. In visible light ID communication, a unique ID is allocated to each visible light ID client and is used to manage many ID clients and to read and update information about IDs of the ID clients. An ID allocated to each ID client may be mapped to information of a server, like in a tag ID in radio frequency identification (RFID). In other words, detailed information mapped to an ID of a specific ID client may be stored in the server, and a user may call the detailed information from the server and may obtain the detailed information. On the other hands, in visible light data communication, various types of data, such as voice, images, texts, and the like, are transmitted and received in a simplex or duplex communication manner.

FIG. 1 illustrates a visible light data communication system according to the related art. A visible light data access point (AP) 3 that provides a visible light data communication service includes one or a plurality of LEDs 4 that emit visible light. A visible light data client 5 transmits and receives information to and from the visible light data AP 3 in a duplex communication manner. The visible light data AP 3 may transmit data information to the visible light data client 5 and may receive the data information from a server 1 connected to a network 2 and may also transmit the data information to the visible light data client 5.

FIG. 2 is a view of a visible light ID communication system according to the related art. A visible light ID collector 8 includes one or a plurality of LEDs 9 that emit visible light. A visible light tag client 10 receives a command from the visible light ID collector 8 and transmits an ID value to the visible light ID collector 8. The visible light ID collector 8 obtains information mapped to a visible light ID from a server 6 connected to a network 7.

However, the visible light data AP 3 illustrated in FIG. 1 and the visible light ID collector 8 illustrated in FIG. 2 generally use different protocols and have different hardware configurations. Thus, in order to provide a visible light data communication service and a visible light ID communication service in the same place, the visible light data AP 3 of FIG. 1 and the visible light ID collector 8 of FIG. 2, respectively, need to be installed. In addition, the visible light data AP 3 of FIG. 1 and the visible light ID collector 8 of FIG. 2 should be separated from each other by a sufficient distance so that they do not interfere with each other. Thus, in a general visible light communication system, when visible light ID communication and visible light data communication are simultaneously used, interference therebetween occur, and visible light ID communication and visible light data communication cannot be used in the same place.

In addition, general visible light communication methods mainly relate to one-to-one communication methods. Since a specific method of simultaneously performing communication between an AP 3 connected to a server 1 and a plurality of clients 5, 10 by using visible light has not been developed, a visible light multiplex communication system that satisfies this need is necessary.

SUMMARY OF THE INVENTION

The present invention provides a visible light multiplex communication system in which visible light communication can be smoothly performed in a state where visible light identification (ID) communication and visible light data communication do not interfere with each other in the same space.

The present invention also provides a visible light multiplex communication system in which data can be efficiently transmitted and received to and from a plurality of ID clients and a plurality of data clients by using visible light.

According to an aspect of the present invention, a visible light multiplex communication system that performs communication between a server and a plurality of clients by using visible light, includes: an access point (AP) connected to the server via a network, transmitting a signal to each of the plurality of clients by emitting the visible light and receiving the signal from each of the plurality of clients by detecting the visible light emitted from each client; a plurality of tag clients transmitting and receiving their own identification (ID) information to and from the AP by using the visible light; and a plurality of data clients transmitting and receiving data information including at least one among voice, an image, and a text to and from the AP by using the visible light.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

The main point of the present invention provides a system that provides visible light identification (ID) communication and visible light data communication simultaneously and provides visible light data communication to a plurality of users simultaneously.

Figure 1:
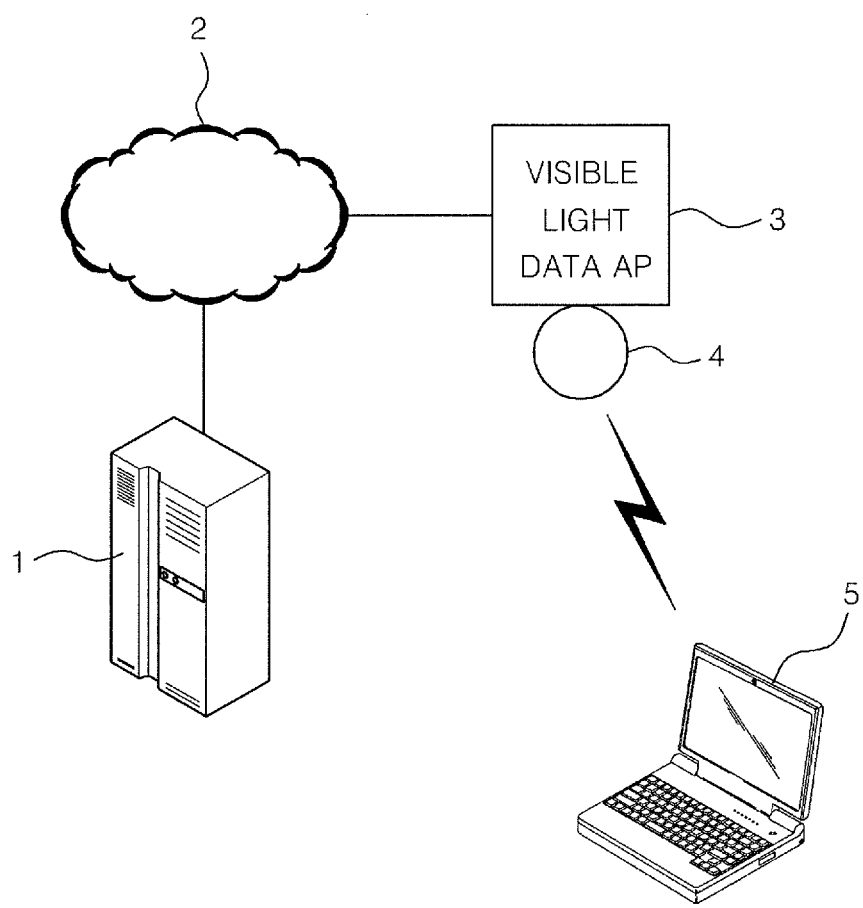
FIG. 1 illustrates a visible light data communication system according to the related art.
Figure 2:
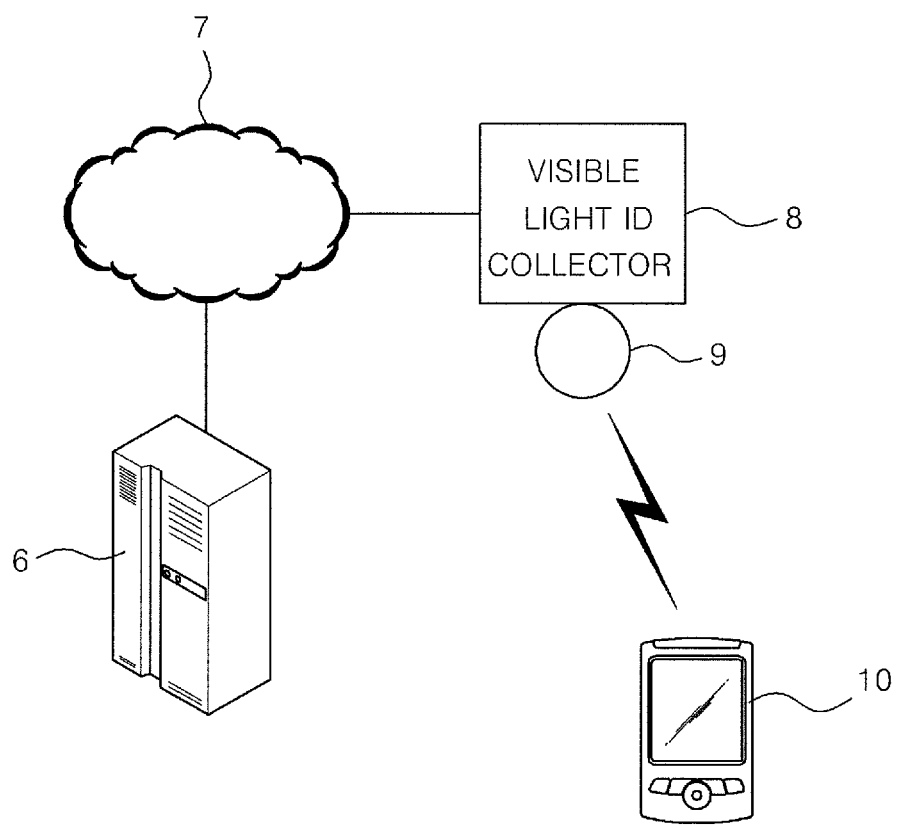
FIG. 2 illustrates a visible light identification (ID) communication system according to the related art.
Figure 3:
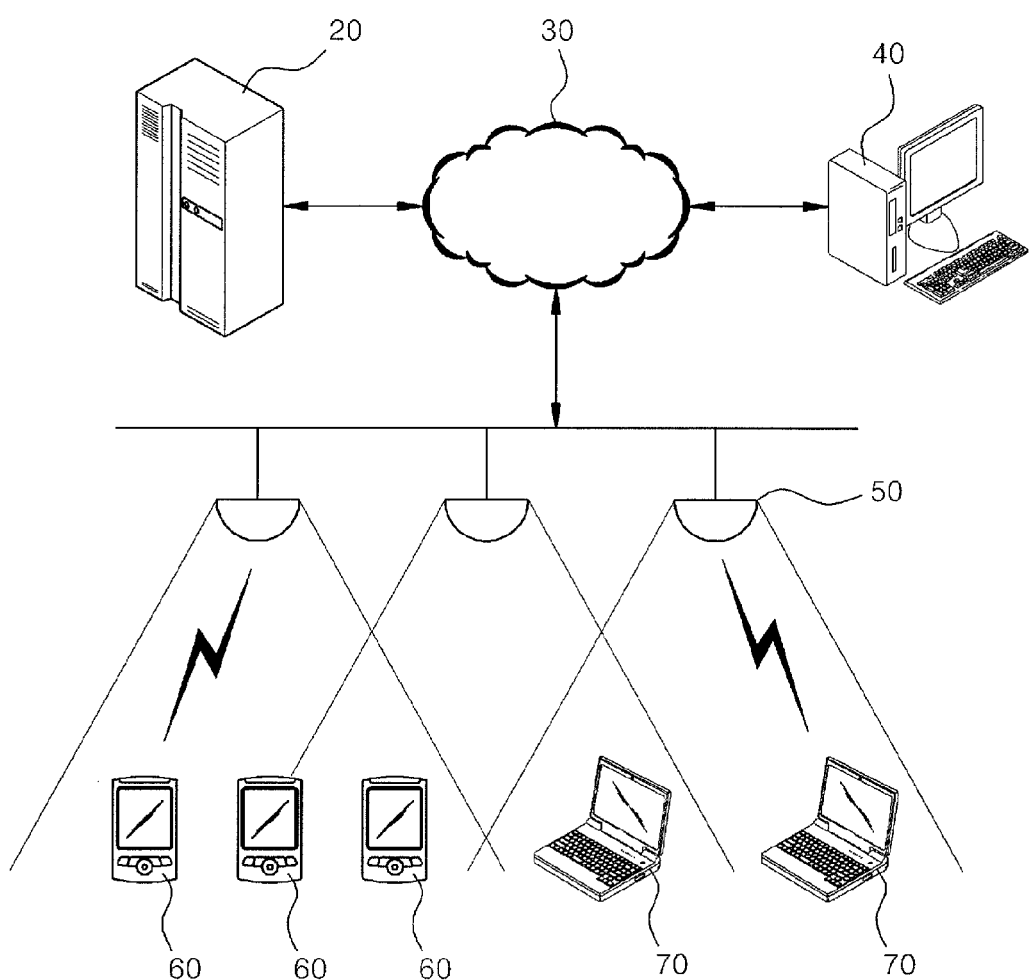
FIG. 3 is a schematic diagram of a visible light multiplex communication system according to an embodiment of the present invention.
Figure 4:
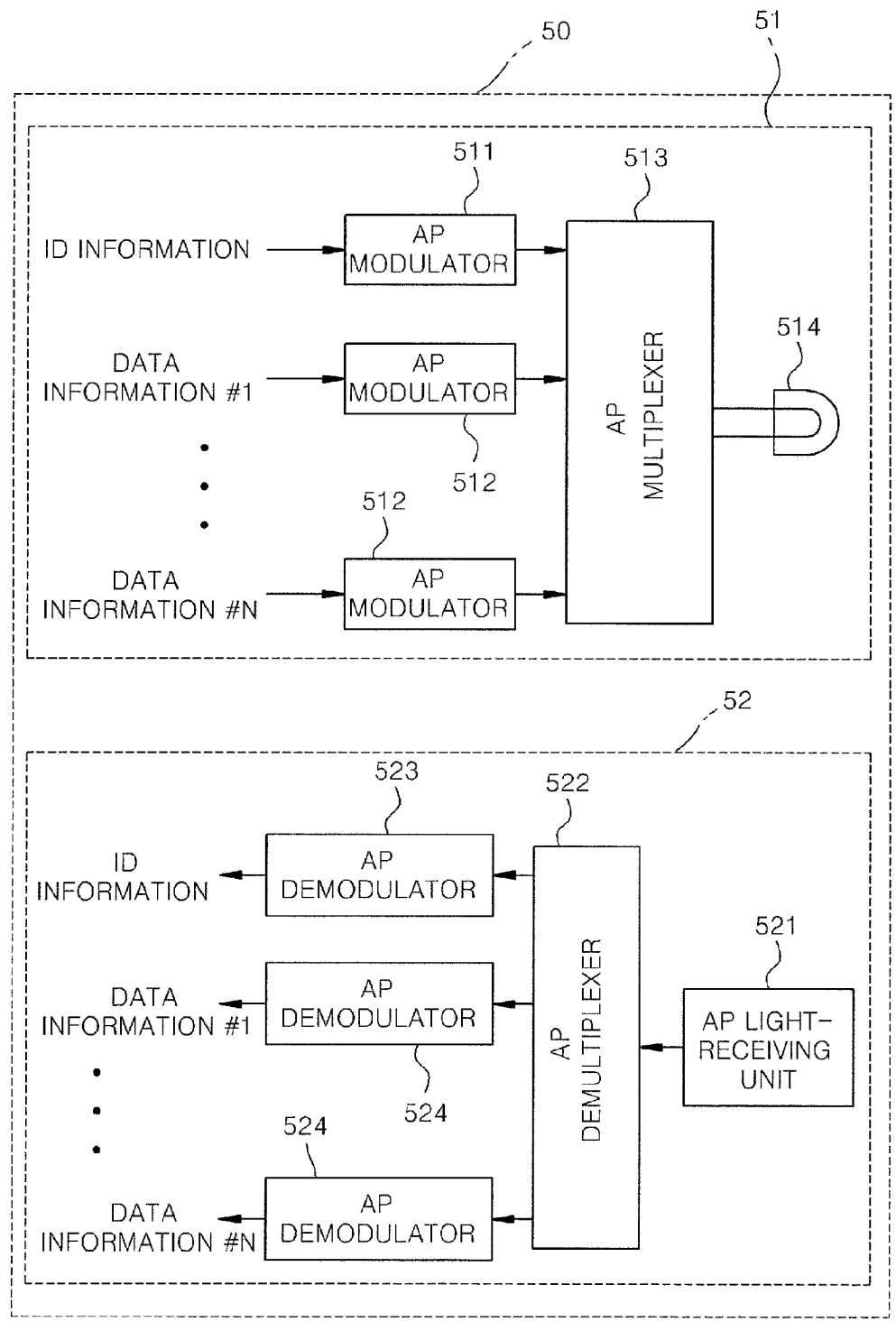
FIG. 4 is a block diagram of an access point (AP) of the visible light multiplex communication system illustrated in FIG. 3, according to an embodiment of the present invention.
Figure 5:
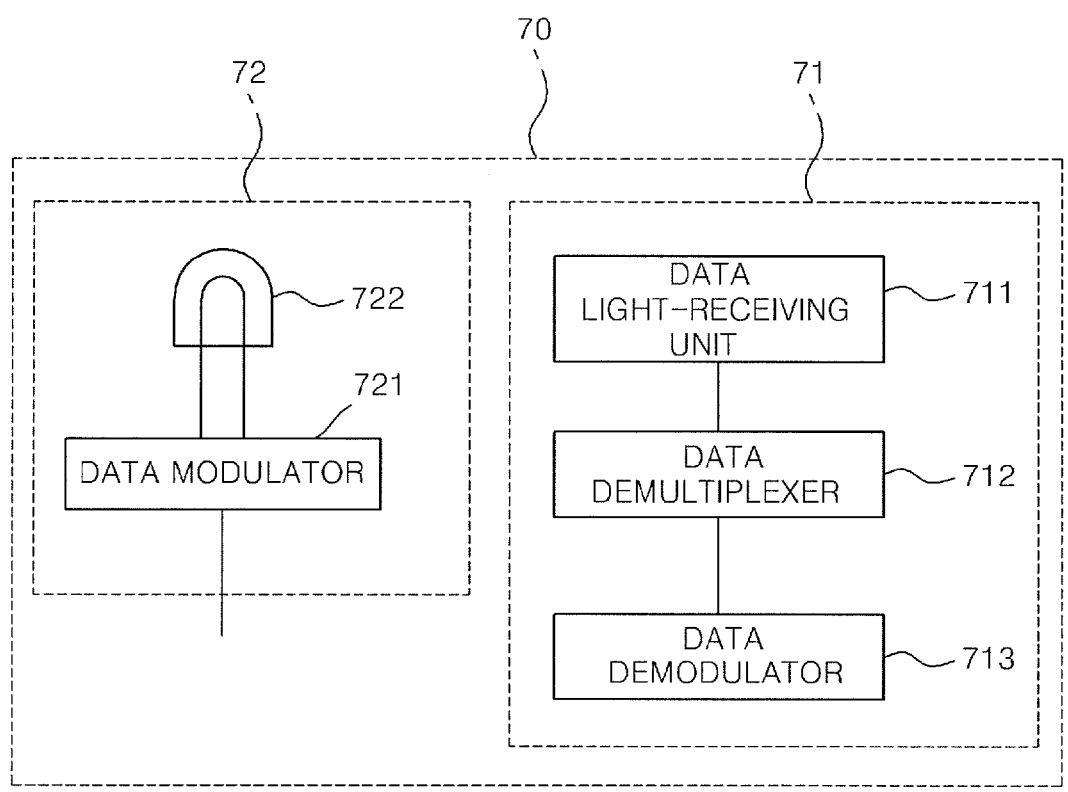
FIG. 5 is a block diagram of a plurality of data clients of the visible light multiplex communication system of FIG. 3.
Figure 6:
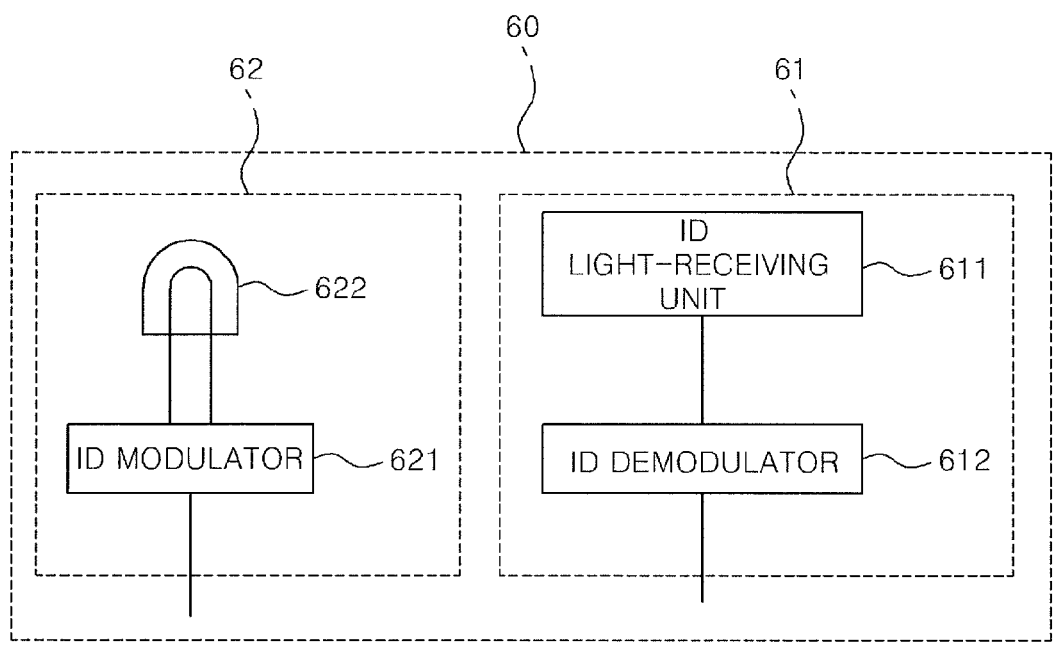
FIG. 6 is a block diagram of a plurality of tag clients of the visible light multiplex communication system of FIG. 3.

FIG. 3 is a schematic diagram of a visible light multiplex communication system according to an embodiment of the present invention, FIG. 4 is a block diagram of an access point (AP) 50 of the visible light multiplex communication system illustrated in FIG. 3, according to an embodiment of the present invention, FIG. 5 is a block diagram of a plurality of data clients 70 of the visible light multiplex communication system of FIG. 3, and FIG. 6 is a block diagram of a plurality of tag clients 60 of the visible light multiplex communication system of FIG. 3.

Referring to FIGS. 3 through 6, the visible light multiplex communication system illustrated in FIG. 3 includes a server 20, an AP 50, a plurality of tag clients 60, and a plurality of data clients 70.

The server 20 and the AP 50 are connected to each other via a network 30. Various types of communication methods, such as the Internet, radio frequency (RF) wireless communication, and the like, may be used as the network 30.

The AP 50 performs communication between clients by transmitting and receiving visible light. The AP 50 transmits and receives ID information to and from the tag clients 60 and transmits and receives data information to and from the data clients 70.

The ID information refers to unique ID allocated to each of the tag clients 60, like tag ID in radio frequency identification (RFID). Detailed information mapped to ID of each tag client 60 is stored in the server 20. Each tag client 60 transmits and receives their own ID information to and from the AP 50 by using visible light communication, thereby inquiring detailed information of corresponding ID stored in the server 20 and updating new information.

The data information includes information, such as voice, an image, a text, and the like. The AP 50 transmits and receives visible light to and from each data client 70, thereby exchanging the data information. Data information transmitted from the AP 50 to each data client 70 and data information received by the AP 50 from each data client 70 are stored in the server 20.

A host controller 40 is connected to the server 20 and the AP 50 via the network 30. The host controller 40 controls the AP 50 and checks information transmitted and received to and from the AP 50.

Referring to FIG. 4, an AP transmitting unit 51 includes AP modulators 511 and 512, an AP multiplexer 513, and an AP light-emitting unit 514.

As illustrated in FIG. 4, the AP modulators 511 and 512 modulate the ID information to be transmitted to each tag client 60 or the data information to be transmitted to each data client 70 into a form in which the ID information or the data information can be easily transmitted as a visible light signal. One AP modulator 511 for modulating the ID information and N AP modulators 512 for modulating the data information are shown in FIG. 4. Various methods for modulating the ID information and the data information, such as amplitude shift keying (ASK) method and the like, may be used in the AP modulators 511 and 512. When the ASK method is used in the AP modulators 511 and 512, an on/off keying (OOK) method having a modulation index of 100% may be generally used so as to improve signal transmission efficiency.

The AP multiplexer 513 integrates signals modulated by the AP modulators 511 and 512 and multiplexes the signals so that the multiplexed signals can be easily transmitted as visible light signals.

The AP light-emitting unit 514 converts an electrical signal multiplexed by the AP multiplexer 513 into a visible light signal and transmits the electrical signal. A laser diode (LD), a light-emitting diode (LED), or the like may be used as the AP light-emitting unit 514. In particular, the LED may perform the function of illumination and the function of a visible light communication unit simultaneously. In addition, the LED does not use a mercury ingredient or the like contained in a fluorescent lamp or an incandescent lamp that is used as a general illumination lamp and thus is eco-friendly.

Referring to FIG. 4, an AP receiving unit 52 includes an AP light-receiving unit 521, an AP demultiplexer 522, and AP demodulators 523 and 524.

The AP light-receiving unit 521 detects the visible light signal transmitted from each tag client 60 and each data client 70 in the form of visible light and converts the detected visible light signal into an electrical signal. A photodetector (PD) or the like may be used as the AP light-receiving unit 521.

The AP demultiplexer 522 splits the signal converted by the AP light-receiving unit 521 into separate signals that correspond to each tag client 60 and each data client 70, respectively.

The AP demodulators 523 and 524 demodulate the signals transmitted from the AP demultiplexer 522 into ID information and data information that correspond to each tag client 60 and each data client 70, respectively.

Referring to FIG. 5, each data client 70 includes a data receiving unit 71 that receives the data information from the AP 50 and a data transmitting unit 72 that transmits the data information to the AP 50.

The data receiving unit 71 includes a data light-receiving unit 711 that detects the visible light signal transmitted from the AP 50 and converts the detected visible light signal into an electrical signal, a data demultiplexer 712 that extracts only a signal corresponding to each own data client 70 from the electrical signal converted by the data light-receiving unit 711, and a data demodulator 713 that demodulates the signal transmitted from the data demultiplexer 712.

The data transmitting unit 72 includes a data modulator 721 that modulates the data information to be transmitted to the server 20 into a form in which the data information can be easily transmitted as a visible light signal, and a data light-emitting unit 722 that converts the modulated data information into a visible light signal.

Referring to FIG. 6, each tag client 60 includes an ID receiving unit 61 that receives the ID information from the AP 50 and an ID transmitting unit 62 that transmits the ID information to the AP 50.

The ID receiving unit 61 includes an ID light-receiving unit 611 that detects the visible light signal transmitted from the AP 50 and converts the detected visible light signal into an electrical signal, and an ID demodulator 612 that demodulates the signal converted by the ID light-receiving unit 611.

The ID transmitting unit 62 includes an ID modulator 621 that modulates the ID information to be transmitted to the server 20 into a form in which the ID information can be easily transmitted as a visible light signal, and an ID light-emitting unit 622 that converts the modulated ID information into a visible light signal.

An LED, an LD, or the like may be used as the data light-emitting unit 722 and the ID light-emitting unit 622, like in the AP light-emitting unit 514. A PD or the like may be used as the data light-receiving unit 711 and the ID light-receiving unit 611, like in the AP light-receiving unit 521.

As described above, when the AP modulators 511 and 512 modulate a signal by using the ASK method, the data modulator 721 and the ID modulator 621 modulate a signal by using the ASK method. This also applies to a case where the AP modulators 511 and 512 use the OOK modulation method having a modulation index of 100%.

Figure 7:
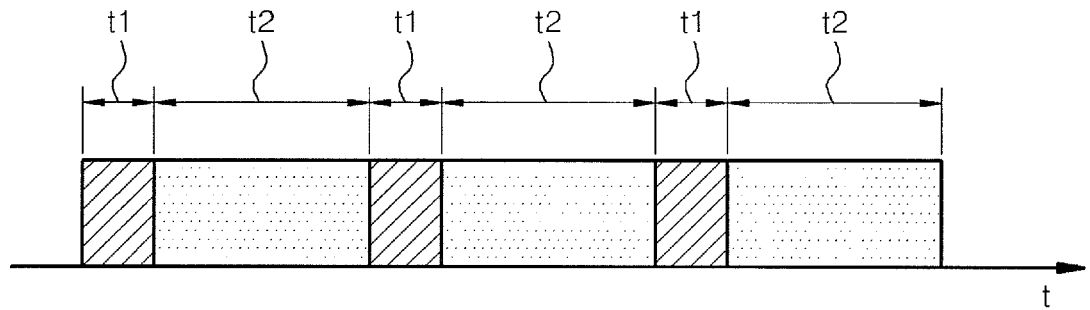
FIG. 7 illustrates an example of time division of ID communication and data communication performed by the visible light multiplex communication system of FIG. 3.
Figure 8:
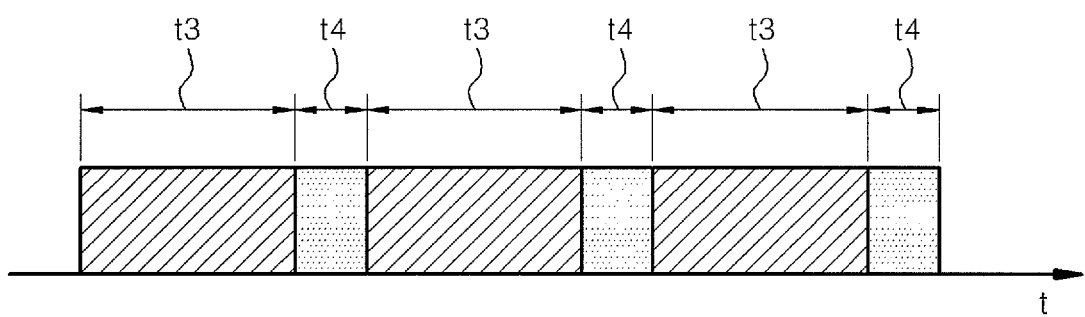
FIG. 8 illustrates another example of time division of ID communication and data communication performed by the visible light multiplex communication system of FIG. 3.

FIG. 7 illustrates an example of time division of ID communication and data communication performed by the visible light multiplex communication system of FIG. 3, and FIG. 8 illustrates another example of time division of ID communication and data communication performed by the visible light multiplex communication system of FIG. 3.

Meanwhile, the AP multiplexer 513 of the AP 50 performs time division on each of the data information and the ID information into time slots that correspond to predetermined time intervals, thereby multiplexing the time-divided data information and ID information to be allocated to separate time slots, respectively. For example, the AP multiplexer 513 may allocate one time slot t1 to ID communication and may allocate three time slots t2 to data communication, as illustrated in FIG. 7. In addition, the AP multiplexer 513 may allocate three time slots t3 to ID communication and may allocate one time slot t4 to data communication, as illustrated in FIG. 8. The number and combination of time slots allocated to data communication and ID communication may be adjusted according to the need of ID communication and the amount of data used in data communication.

Each tag client 60 transmits and receives the ID information to and from the time slots t1 and t3 allocated for ID communication, and each data client 70 transmits data to the time slots t2 and t4 allocated for data communication.

An LED for white light generally makes white light by coating a fluorescent substance on a blue LED or by combining three primary colors, such as red, green, and blue. FIGS. 3 through 8 described above illustrate the case where white light is made by coating the fluorescent substance on the blue LED or only a monochromatic LED is used. Since the visible light multiplex communication system of FIG. 3 uses visible light having one frequency (amplitude), the visible light multiplex communication system of FIG. 3 performs time division on each of the ID information and the data information for ID communication and data communication so that visible light communication can be performed.

Next, the case where white light is made by combining three primary colors, such as red, green, and blue, according to another embodiment of the present invention will be described with reference to FIGS. 9 through 11.

Figure 9:
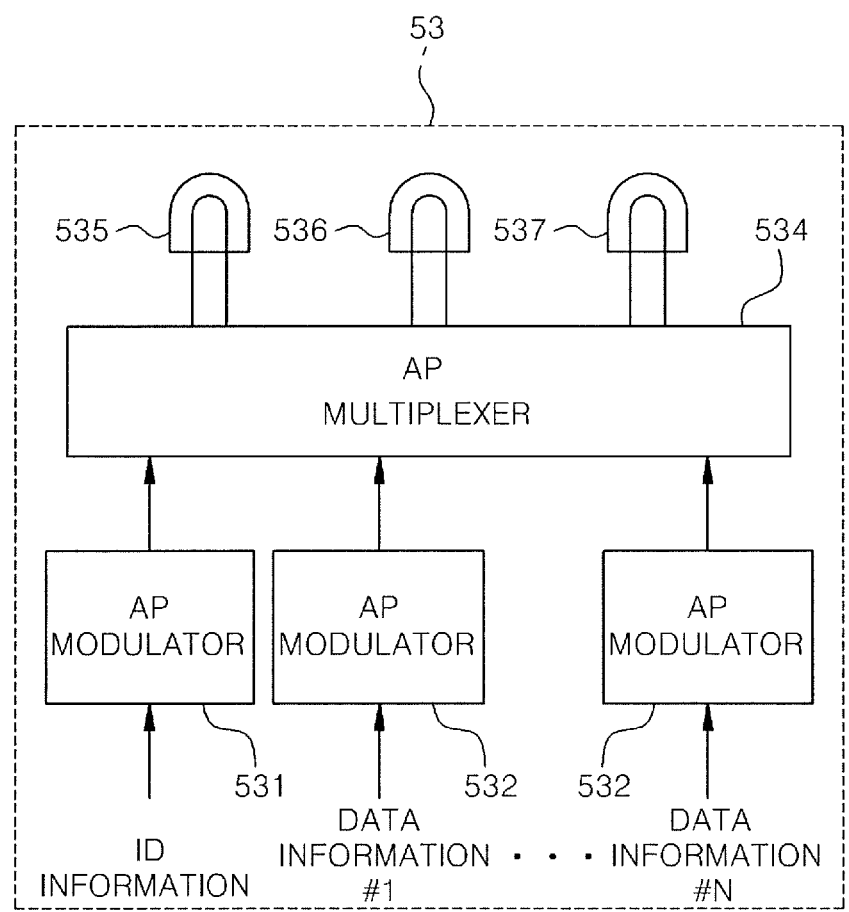
FIG. 9 is a block diagram of an AP of the visible light multiplex communication system illustrated in FIG. 3, according to another embodiment of the present invention.
Figure 10:
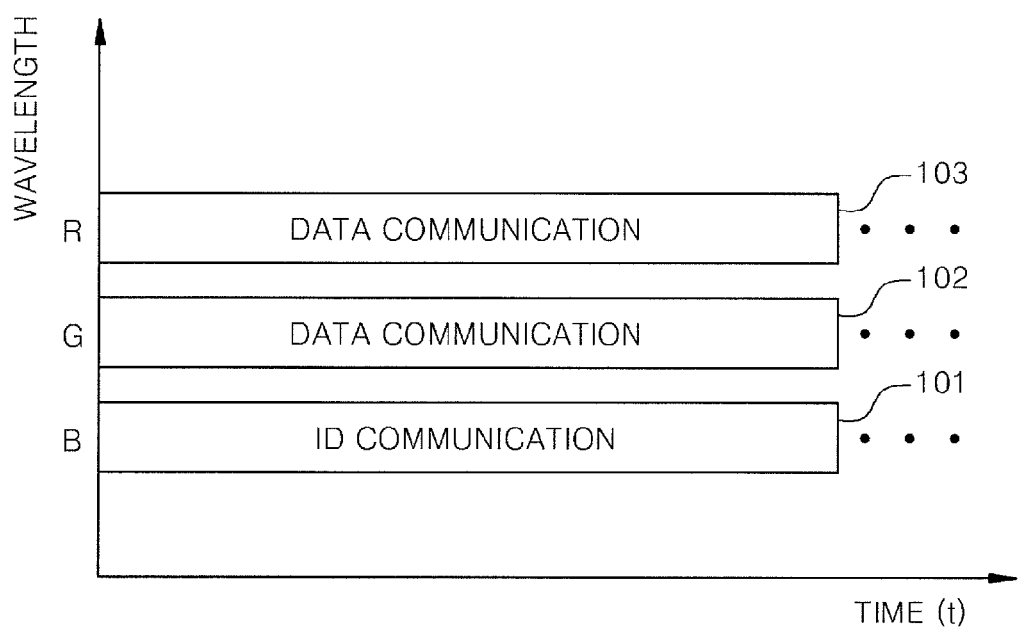
FIGS. 10 and 11 illustrate ID communication and data communication by using the AP of the visible light multiplex communication system illustrated in FIG. 9, according to embodiments of the present invention.
Figure 11:
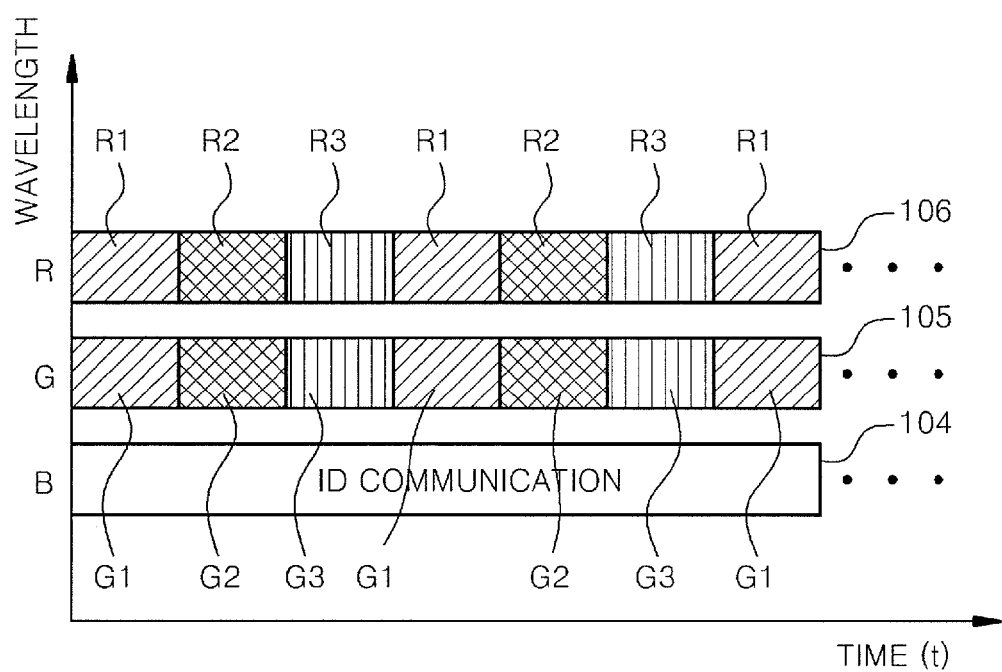

FIG. 9 is a block diagram of an AP of the visible light multiplex communication system illustrated in FIG. 3, according to another embodiment of the present invention, and FIGS. 10 and 11 illustrate ID communication and data communication by using the AP of the visible light multiplex communication system illustrated in FIG. 9, according to embodiments of the present invention.

The entire configuration of the visible light multiplex communication system of FIG. 9 is the same as that of FIG. 3, and the difference between the previous embodiment (FIGS. 3 through 6) and the current embodiment (FIGS. 9 through 11) is that an AP transmitting unit 53 illustrated in FIG. 9 is used, instead of the AP transmitting unit 51 illustrated in FIG. 4 is used. Other elements, such as a server 20, a host controller 40, a plurality of tag clients 60, and a plurality of data clients 70, have structures that are the same as or similar to those of the previous embodiment.

Referring to FIG. 9, the AP transmitting unit 53 of the AP 50 includes a plurality of AP modulators 531 and 532, an AP multiplexer 534, and three AP light-emitting units 535, 536, and 537.

One AP modulator 531 among the AP modulators 531 and 532 modulates ID information, and the other AP modulators 532 modulate data information. The AP multiplexer 534 integrates signals transmitted from the AP modulators 531 and 532 and multiplexes the signals to be transmitted by the AP light-emitting units 535, 536, 537 as visible light signals. The three AP light-emitting units 535, 536, and 537 are red, green, and blue LEDs, respectively, and thus emit visible lights having different frequencies.

As illustrated in FIG. 10, the AP multiplexer 534 may multiplex the signals transmitted by the AP modulators 531 and 532 by allocating ID information 101 to the AP light-emitting unit 537 so that the AP light-emitting unit 537 can transmit the ID information 101 as a visible light signal. In addition, as illustrated in FIG. 10, the AP multiplexer 534 may multiplex the signals transmitted by the AP modulators 531 and 532 by allocating data information 102 and 103 to the AP light-emitting units 535 and 536, respectively, so that the AP light-emitting units 535 and 536 can transmit the data information 102 and 103 as visible light signals.

Accordingly, each tag client 60 and each data client 70 receive or transmit visible light having an allocated frequency, thereby performing visible light communication. For example, in FIG. 10, the tag clients 60 transmit and receive only blue light 101, and the data clients 70 transmit and receive red light 103 or green light 102.

In addition, each tag client 60 may demodulate the ID information by filtering the blue light 101 in the ID light-receiving unit 611, and each data client 70 may separate information required for each data client 70 from the data demultiplexer 712 by filtering the red light 103 or the green light 102 by using the data light-receiving unit 711. In this regard, an optical filter through which only visible light having a specific wavelength is transmitted, may be installed at the ID light-receiving unit 611 and the data light-receiving unit 711 so that the ID light-receiving unit 611 and the data light-receiving unit 711 can receive visible light signals having desired colors.

FIG. 11 illustrates a case where ID information and data information are multiplexed in the AP transmitting unit 51 including three AP light-emitting units 533, 536, and 537 that emit red light 106, green light 105, and blue light 104, respectively, according to another embodiment of the present invention. In FIG. 11, the ID information is multiplexed to be transmitted only through the blue light 104, and the data information is multiplexed in such a way that time division is performed on the red light 106 and the green light 105 into three time slots R1, R2, and R3 and three time slots G1, G2, and G3 each having a predetermined time interval, respectively and data communication with each data client 70 can be performed in each of the time slots R1, R2, and R3 and the time slots G1, G2, and G3. In this regard, the ID light-receiving unit 611 may receive only the blue light 104, and the data light-receiving unit 711 may receive only the red light 106 or the green light 105.

Multiplex visible light communication has been performed by using visible lights, such as red light, green light, and blue light having three different frequencies. However, a visible light multiplex communication system according to the present invention that performs multiplex visible light communication by combining various colors of visible lights having different frequencies, as described above, may be constituted.

According to the present invention, visible light ID communication and visible light data communication can be efficiently performed in a state where interference between a plurality of clients using different protocols does not occur in the same place.

In addition, according to the present invention, a specific unit that is capable of efficiently transmitting and receiving data to and from a plurality of clients by using visible light can be provided.

While the invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A visible light multiplex communication system that performs communication between a server, a plurality of tag clients and a plurality of data clients by using visible light signals, the system comprising:
   an access point (AP) connected to the server via a network, transmitting visible light signals to each of the tag and data clients and receiving and detecting visible light signals from each of the tag and data clients, wherein the AP comprises:
   an AP transmitting unit transmitting visible light signals to the tag clients and the data clients, wherein the AP transmitting unit comprises:
      a plurality of AP modulators modulating ID information for the tag clients and data information for the data clients such that
         at least one of the AP modulators modulating electrical signals that correspond to ID information for the tag clients, and
         at least another one of the AP modulators modulating electrical signals that correspond to data information for the data clients;
      an AP multiplexer converting the modulated ID information and data information into integrated signals; and
      an AP light-emitting unit converting the integrated signals from the AP multiplexer into visible light signals; and
   an AP receiving unit receiving visible light signals from the tag clients and the data clients, wherein the AP receiving unit comprises:
      an AP light-receiving unit detecting and converting visible light signals transmitted from the tag clients and the data clients into electrical signals;
      an AP demultiplexer splitting electrical signals that respectively correspond to the tag and data clients;
      a plurality of AP demodulators demodulating split electrical signals such that
         at least one of the AP demodulators demodulating split electrical signals into ID information for the tag clients, and
         at least another one of the AP demodulators demodulating split electrical signals into data information for the data clients;
   the tag clients transmitting and receiving their own identification (ID) information to and from the AP by using visible light signals; and
   the data clients transmitting and receiving data information comprising at least one among a voice, an image, and a text to and from the AP by using visible light signals wherein each data client comprises:
      a data receiving unit comprising:
         a data light-receiving unit detecting and converting visible light signals transmitted from the AP into electrical signals,
         a data demultiplexer extracting electrical signals that correspond to each respective data client, and
         a data demodulator demodulating electrical signals from the data demultiplexer; and
      a data transmitting unit comprising:
         a data modulator modulating data information for each respective data client, and
         a data light-emitting unit converting and transmitting the modulated data information into visible light signals to the server.

2. The visible light multiplex communication system of claim 1, wherein each tag client comprises:
   an ID receiving unit comprising:
      an ID light-receiving unit detecting and converting visible light signals transmitted from the AP electrical signals; and
      an ID demodulator demodulating electrical signals converted from the ID light-receiving unit; and
   an ID transmitting unit comprising:
      an ID modulator modulating ID information; and
      an ID light-emitting unit converting the modulated ID information into visible light signals.

3. The visible light multiplex communication system of claim 2, wherein the AP modulator, the data modulator, and the ID modulator modulate electrical signals by using an amplitude shift keying (ASK) method.

4. The visible light multiplex communication system of claim 3, wherein the AP modulator, the data modulator, and the ID modulator modulate electrical signals by using an on/off keying (OOK) method having a modulation index of 100%.

5. The visible light multiplex communication system of claim 2, wherein the AP multiplexer multiplexes and allocates data information and ID information into separate time slots divided into predetermined time intervals, and each data client transmits and receives data information at time slots respectively allocated to each data client, and each tag client transmits and receives ID information at the time slots respectively allocated each tag client.

6. The visible light multiplex communication system of claim 5, wherein wireless communication is performed using white light or monochromatic light.

7. The visible light multiplex communication system of claim 2, wherein the AP transmitting unit of the AP comprises:

a plurality of AP light-emitting units in which each AP light emitting unit emits visible light signals at different frequencies; and a plurality of AP light-receiving units equal to the number of AP light-emitting units, in which one of the AP light receiving units receiving and converting visible light signals at a frequency allocated for communication between the AP and each tag client, and at least another one of the AP light receiving units receiving and converting visible light signals at frequencies allocated for communication between the AP and each data client.

8. The visible light multiplex communication system of claim 7, wherein the AP and each data client transmit and receive visible light signals corresponding to data information in predetermined time intervals and at frequencies allocated to each data client.

* * * * *